455-612 AU 233 EX
FIP8106 XR 3,351,930

Nov. 7, 1967

H. J. ZWEIG 3,351,930

METHOD OF AND APPARATUS FOR ANALOG TO DIGITAL DATA CONVERSION

Filed Feb. 14, 1963

2 Sheets-Sheet 1

INVENTOR
HANS J. ZWEIG

BY

Paul B. Fihe

PATENT AGENT

Nov. 7, 1967

H. J. ZWEIG

METHOD OF AND APPARATUS FOR ANALOG TO DIGITAL DATA CONVERSION 3,351,930

Filed Feb. 14, 1963

2 Sheets-Sheet 2

INVENTOR
HANS J. ZWEIG

BY

Paul B. Fihe

PATENT AGENT 3,351,930
Patented Nov. 7, 1967

3,351,930

METHOD OF AND APPARATUS FOR ANALOG TO DIGITAL DATA CONVERSION

Hans Jacob Zweig, 151 Calderon Ave., Mountain View, Calif. 94040

Filed Feb. 14, 1963, Ser. No. 258,474
9 Claims. (Cl. 340—347)

Figure 1:
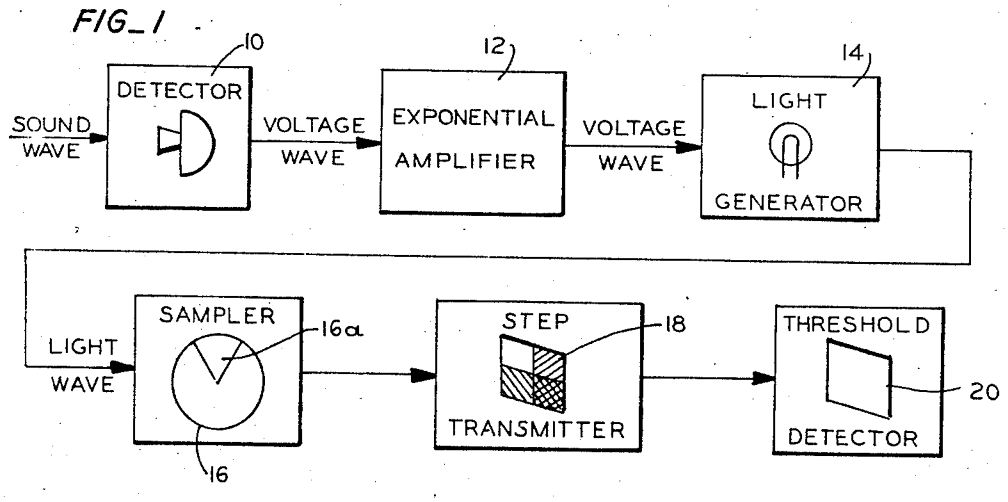

The present invention relates generally to the conversion of analog to digital data, and more particularly, to a method of and apparatus for effecting conversion of analog input data to natural binary or other digital output data.

It is a general object of the present invention to provide a novel method for the conversion of analog input data to digital output data which method is simple, rapid, and accurate, and moreover, can be carried out with inexpensive, trouble-free apparatus.

One feature of the invention is the provision of a method of analog to digital data conversion wherein one step involves the modification or variation of some parameter such as magnitude, frequency, or the like, of the input analog data in a predetermined fashion.

More particularly, such modification, in accordance with an additional aspect of the invention, is a spatio-temporal modification involving variations either in time or space or both.

Additionally, it is a feature of the invention to provide a method for analog digital data conversion involving iterated division of the analog data.

In accordance with one aspect of the invention, the method can include the step of initial exponential amplification or other transformation of the input analog data so that the aforementioned division operation can be carried out by the simple subtraction of exponents.

Yet a further feature of the invention is the provision of various techniques for carrying out the division operation including, but not limited to, attenuation of radiant energy, such as light, or predetermined reduction of voltage.

Yet another feature of the invention is the provision for spatio-temporal sampling of the data to be converted.

It is another feature of the invention to provide a novel step for the detection of the sampled data.

More particularly, such detection step involves the iterated detection of the modified or varied parameter mentioned hereinabove.

In accordance with one specific aspect of the invention, the iterated detection is carried out within a predetermined range to provide a binary digital output.

Yet, more specifically, the detection can be carried out to effect a binary digital output representative of the individual digits of the output binary number.

A further feature of the invention is the provision of various threshold devices or combinations of same to achieve the requisite detection.

Specifically, it is a feature to provide a particular double threshold arrangement for effecting detection of magnitudes within a predetermined range.

A correlated feature is the provision of a semi-logical device with a binary-valued output that can be utilized in conjunction with the aforementioned double detector to provide binary digital output data.

Figure 2:
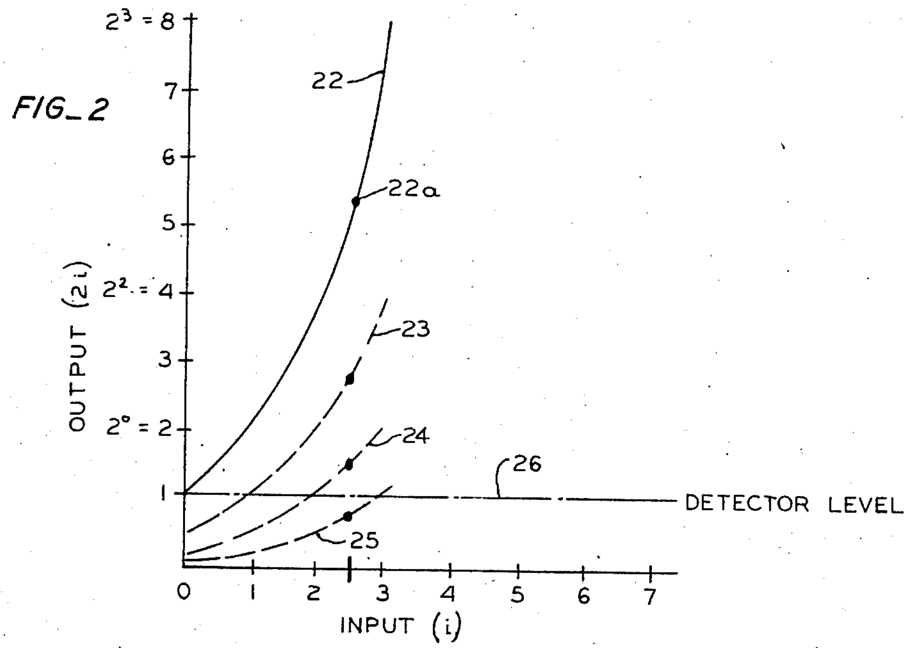
Figure 3:
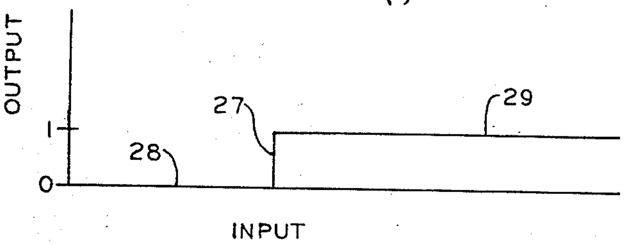
Figure 4:
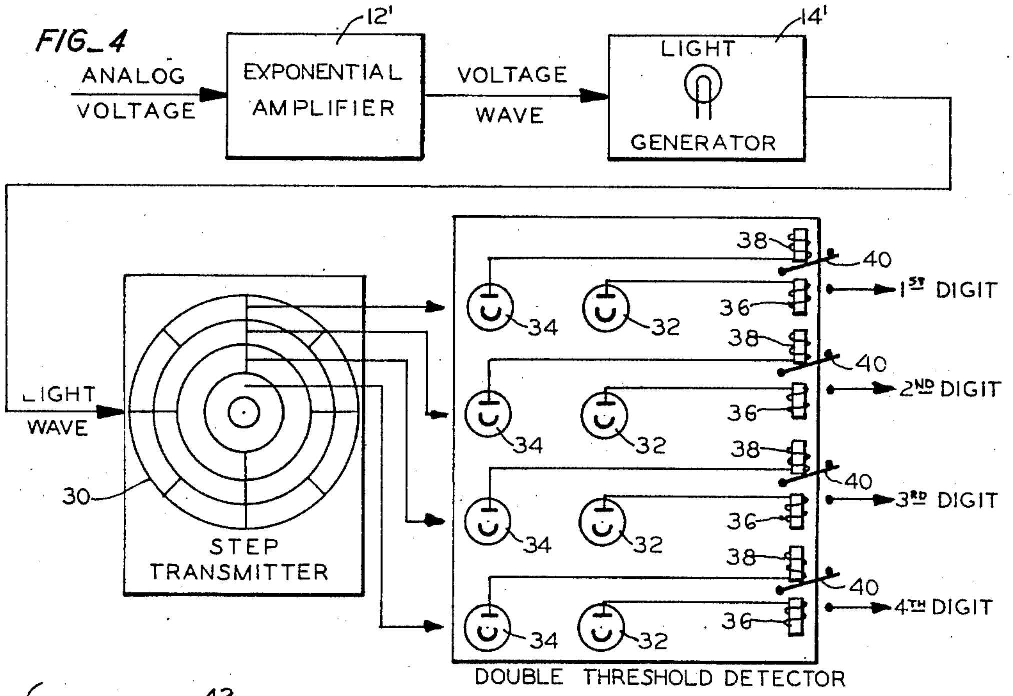
Figure 5:
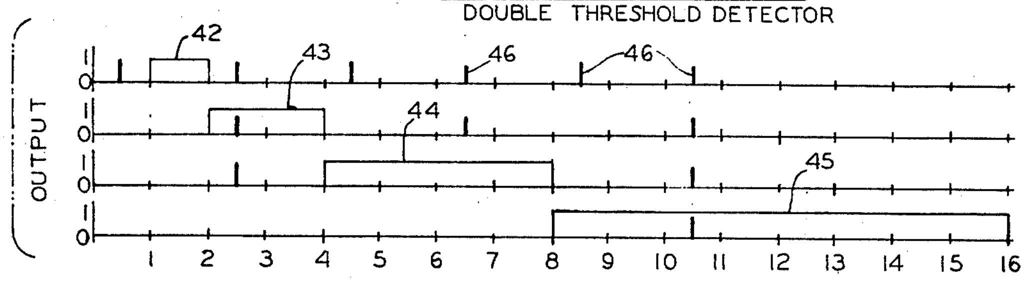
Figures 6, 7:
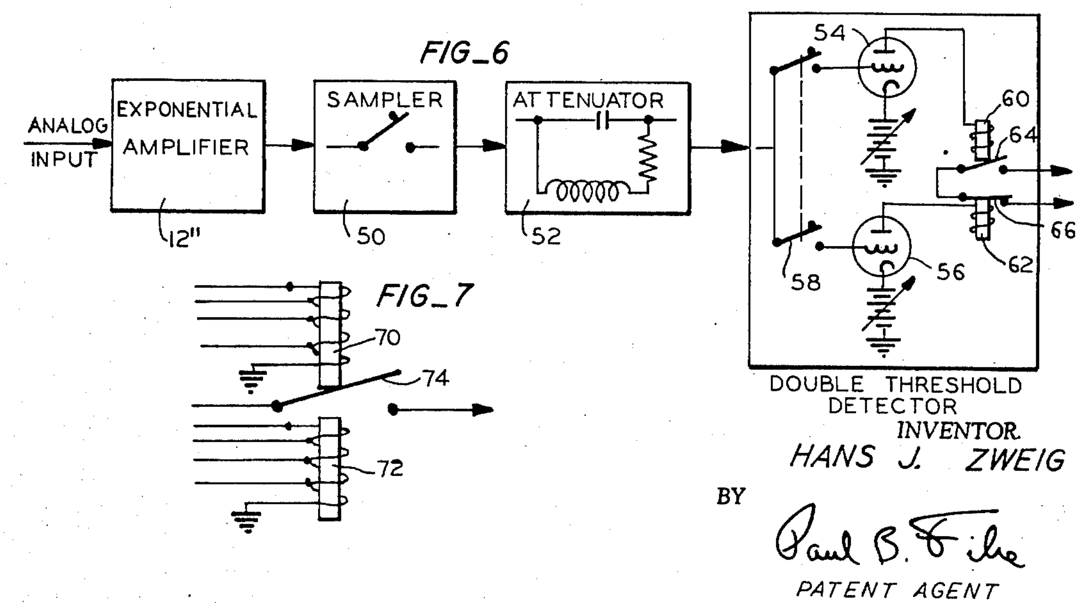

These as well as other objects and features of the invention will become more apparent from the following description of several embodiments of the method together with description of several apparatuses for carrying out the described method in an expeditious fashion, reference being made to the accompanying drawings wherein:

FIG. 1 is a diagrammatic representation of one apparatus for carrying out the steps of analog to digital data conversion in accordance with the present invention, FIG. 2 is a graphical representation of certain characteristics of the apparatus shown in FIG. 1 to assist in explanation of its functioning, FIG. 3 is a graphical representation of the digital output of the apparatus illustrated in FIG. 1, FIG. 4 is a modified embodiment of the invention showing apparatus specifically arranged for the conversion of input analog data to binary output data, FIG. 5 is a graphical representation of an exemplary digital output of the apparatus illustrated in FIG. 4, FIG. 6 is another modified apparatus for carrying out the method of the present invention, and FIG. 7 is a diagrammatic illustration of a binary-valued semi-logical device of a type utilized as an element in the FIG. 4 apparatus.

A new procedure in the art of analog to digital data conversion is presented which allows of operations to be performed on a continuously variable physical quantity. These operations are in many instances more easily and naturally performed than those previously employed and result in the quantizing of the substance and representation of its magnitude in a discrete or digital form. Another advantage of the procedure is that when it is used in conjunction with photographic films or plates it produces a full utilization of the detecting ability of these materials over spatio-temporal regions (1. H. J. Zweig, "The Relation of Quantum Efficiency to Energy and Contrast-Detectivity for Photographic Materials," Phot. Sci. and Eng. 5 (1961), pp. 142–148) a characteristic which makes photographic detectors exceptionally suitable as encoding devices.

Devices for converting a continually variable magnitude such as a voltage, light intensity, or length to a discrete set of numbers have in the past embodied two basic methods. The first method consists in dividing the range of the continuous variable into a finite number of parts and associating with each part a number. The particular interval into which the continuous variable falls at some particular instance is then noted by the device which records or transmits this number or some code pattern related to it (2. R. W. Sears, "Electron Beam Deflection Tube for Pulse Code Modulation," Bell Syst. Tech. J. 27 (1948), pp. 44–57). This principle is employed for example in those analog-digital converters operating on a rotating shaft whose angular positions are translated into digital form. The other procedure for analog-digital conversion is directly related to the number system in which the digital output is expressed. The principle is that of successive or iterated subtraction. For example, the magnitude 11½ could be expressed as 8+2+1+½ or equivalently as $$1\cdot2^3+0\cdot2^2+1\cdot2^1+1\cdot2^0+\tfrac{1}{2}$$

which could be written as (1, 0, 1, 1; ½) where the numbers before the semicolon denote the respective integer powers of two which add up to the magnitude. Thus one can proceed to subtract from any given magnitude successively decreasing the powers of two and thus obtain a binary number for the integral portion of the magnitude. Electronic analog-digital converters are based on this principle (3. W. M. Goodall, "Telephony by Pulse Code Modulation," Bell Syst. Tech. J. 26 (1947), pp. 395–409).

A simpler way of operating on many analog quantities such as voltage, light intensity, etc., is by means of division. Thus it is a fairly easy matter to reduce the strength of a light beam by a factor of two by inserting a filter having 50% transmittance, but it is by no means easy to remove, say, a given number of photons or a given amount of energy. However, division by itself will not usually produce the desired correspondence of magnitudes and discrete numbers. Thus for example successive divisions by two of 12 yields, 6, 3, 1½, that is, three divisions before the result becomes less than one. The number 13 would have the same representation since after the third division we get 1⅝. Using this technique all magnitudes between 8 and 16 would be represented by the integer 3. This can be remedied by applying a nonlinear transformation to the original magnitudes which takes the magnitude and converts it to the exponent of some number. To explain, let 12½ and 13½ be numbers which are to be converted by iterated division to the nearest lower integers. Let $f(r)=2^r$ be a representation of a nonlinear exponentiation or amplification i.e. $f(1)=2^1=2$, $$f(2)=2^2=4,\ f(3)=2^3=8,\ f(12½)=2^{12½}=5740,$$
$$f(13½)=2^{13½}=11,470.$$

Now it is clear that we can divide 5740 by 2 twelve times before we obtain a fraction less than 1 whereas we can divide 11,470 by 2 thirteen times. Thus all magnitudes between 4096 and 8192 will have as their characteristic that they can be divided by 2 just twelve times before obtaining a fraction less than one, but in terms of the original magnitudes this corresponds to those which are larger than 12 but less than 13. Thus, after exponential transformation the number of successive possible divisions provides the desired approximating digital output.

The advantage of this procedure is that it can be realized optically or electronically with a minimum amount of equipment and the output can be obtained in a form suitable for computer input or wireless transmission. One such system is described below, reference being made to FIG. 1.

A sound wave or other time varying signal is fed into a detector 10 and converted to voltage variation which is used to control the grid in a nonlinear, exponential amplifier 12. The output is used to modulate the intensity of a light beam from a generator 14. Thus the intensity is exponentially related to the incoming signal. The light beam is sampled at intervals, e.g., by inserting a rotating disk 16 with a transparent sector 16a in the path of the light beam, and is directed to fall on a steptablet 18 of light transmitting filters whose transmittances decrease by steps of two from 0.5 to 0.25 to .125 etc. Behind this steptablet there are either a set of photocells or a set of code patterns bearing a one to one relation with the successive steps in the transmittance tablet. In the latter case a high gradient photographic film 20 with essentially no toe in its characteristic curve is placed behind the code group and steptablet. It is clear that a weak signal will only pass through a few of the more strongly transmitting steps before becoming too weak to register an image or trigger the photocells behind the strongly absorbing steps. Thus by noting the weakest pattern or the number of triggered photocells the analog-digital conversion is accomplished. The advantage of photographic recording is that it gives an immediate representation either in PPM (pulse position modulation) by using the cut-off of the photographic material or in PCM (pulse code modulation) by having a binary representation of each transmittance level as code pattern recorded on the photographic material. The set of patterns which will be recorded will be a function of the incident energy and the energy required for detection by the photographic material (4. H. J. Zweig, "Theoretical Considerations on the Quantum Efficiency of Photographic Detectors," J. Opt. Soc. Am. 51 (1961), pp. 310–319). The location and form of the pattern will represent the appropriate integer.

The conversion mechanism of the described apparatus can be explained more fully by reference to the graph of FIG. 2 wherein the solid line curve 22 represents the relationship between the input $i$ to the exponential amplifier 12 relative to the output $2^i$ of the exponential amplifier. Thus, if the input analog voltage is represented by the numeral 2.5, the output will be represented on the curve as $2^{2.5}$, as indicated at point 22a on the curve 22. This point 22a will then represent the magnitude of the output of the light generator 14 which is sampled by the rotary disk 16 and delivered to the steptablet 18 which, in turn, reduces the intensity of the radiant energy in accordance with the relative strengths of the filter steps, such reduced energy being represented by the dashed line curves 23, 24 and 25 which respectively indicate an exponential subtraction of 1, 2 and 3. The sensitivity of film 20 determines the level of detection, and is indicated in the graph by the phantom line 26. Reverting to the input analog number 2.5, it will be observed that the signal level from the point 22a reduced by the two filters corresponding to the lines 23 and 24 retains a magnitude that can be sensed by the film 20 but a third filter corresponding to the line 25 will reduce the transmitted light to a level below the film sensitivity. Thus two steps of reduction or attenuation of the transmitted light are permitted and the digit 2 represented by two sensitized film regions is the output data of the unit corresponding to the analog input number 2.5.

To avoid ambiguity of output data, the film 20, constituting a light threshold detector, preferably has a binary-valued output which clearly indicates whether the impinging light is above or below a well-defined threshold level. Such level is indicated by the vertical line 27 in FIG. 3, a zero output indicated at 28 being obtained for input light intensities below this level, and a "one" output indicated at 29 being obtained for all intensities above the threshold level 27. Film 20 of a known type having an extremely high "gamma" characteristic, by way of example, meets the requirement.

But slight modification of the foregoing method will enable the output digital data to be represented in binary digital form, separate outputs being obtainable for the individual digits of the output binary number. In the above-described method and apparatus, the steps included an initial exponential amplification of the input analog magnitude $i$ (e.g. voltage) into a magnitude $b^i$, ($b$) representing some constant number generally larger than unity (e.g. 2 as chosen in FIG. 1 apparatus), then passing the output magnitude of the amplifier through a series of attenuators or filters of differing strengths which vary or reduce such output magnitude and finally, detecting such reduced magnitude by a threshold device, such as the described film 20, ultimately to determine when the reduced magnitude exceeds a given preassigned value so that the number of attenuation steps is the digital counterpart of the analog input.

In the present modification of the described method, to achieve the precise binary output, the threshold detector is modified to consist of a set of double threshold detectors which determine whether the reduced magnitude resulting from the attenuation or other modification of the analog signal is within each of a set of range levels. These range levels vary from one double threshold detector to another and a different attenuation sequence is associated with each such double threshold device in such a manner that the pattern of responses thus generated is a digitalized binary number corresponding to the analog magnitude $i$ from which it is derived.

The following example will illustrate the method. Since it is easier to visualize the process in terms of a sequence of subtractions rather than divisions (i.e. attenuations) and since subtraction of exponents is equivalent to division of the numbers or magnitudes to which the exponents attach (for example $b^{5-2}$ equals $b^5/b^2$), we phrase the example in terms of subtraction (i.e. we are talking about exponents).

Suppose we have magnitudes $b^i$ with $i$ ranging from zero to fifteen and we desire to convert these into natural binary numbers from 0000 to 1111 (equals 15). We proceed as follows. Let 10.5 be the exponent of the magnitude in question. Frst, subtract successively the number two (i.e. divide successively by powers of $b^2$) and note whether in this process a magnitude with exponent between 1 and 2 is ever obtained. If it is, let "one" be the resulting output of this sequence of attenations. In this case we obtain 10.5−2=8.5, 8.5−2=6.5, 6.5−2=4.5, 4.5−2=2.5, 2.5−2=0.5. Since the range from one to two is never obtained, the output of the sequence is "zero." Next subtract successively the number 4 and note whether the resultant exponent ever falls between 2 and 4. We obtain 10.5−4=6.5, 6.5−4=2.5. Since 2.5 is between two and four, the output of this sequence is "one." Next, subtract successively the number 8 and note whether the exponent is ever between 4 and 8. We obtain 10.5−8=2.5, etc. so the output from this sequence is "zero." Last, subtract successively the number 16 and note whether the region from 8 to 16 is ever attained. Since with zero such subtractions we have 10.5 and this is in the required region, the output from this sequence of operations is "one." Reading the output sequence in reverse order to that discussed above we have 1010 which is the binary representation of the number 10 and represents the next lowest integer of the starting exponent, i.e. of 10.5.

One form of apparatus for carrying out the steps is illustrated in FIG. 4 wherein certain elements correspond to those described hereinabove in connection with FIG. 1, and are indicated by like numerals with an added prime notation. The analog voltage derived from any analog input data is initially directed to an exponential amplifier 12' so that the input $i$ is amplified to provide an output voltage $b^1$ which output voltage, as in the previously described embodiment of the invention, is used to modulate a light generator 14'. The resultant light beam is directed to fall on a rotating transparent disk 30 having a series of concentric rings corresponding in number to the number of digits required in the binary output. For exemplary purposes, only four rings are shown. In the outer ring, transparencies having the values $b^0$, $b^{-2}$, $b^{-4}$, $b^{-6}$, etc. are mounted for the step attenuation of the impinging light. If $b$ equals 1.1, by way of example, these transparencies would be filters having values of approximately 1, .82, .67, .55, etc. Associated with such outer ring is a double threshold detector which can, as illustrated, consist of a set of two photocells 32, 34, the first cell 32 responding when the light level exceeds the lower threshold, the second 34 responding when the light level exceeds the upper threshold. The two photocells 32, 34 are electrically connected so that the joint output is "zero" when both are on or both are off, and is "one" when only one is energized, as will be described in detail hereinafter. Obviously, if but one photocell is energized, such photocell is that indicated at 32 with the lower threshold. The two photocells 32, 34 have thresholds of $b^1$ and $b^2$, that is 1.1 and 1.22. The second ring of transparencies has step values $b^0$, $b^{-4}$, $b^{-8}$, $b^{-12}$, and the corresponding thresholds of the associated two photocells 32, 34 have values of $b^2$ and $b^4$. The third ring will have step values of $b^0$ and $b^8$, the fourth ring $b^0$ and the respective photocells associated therewith have corresponding values (i.e. $b^4$, $b^8$ for third set, $b^8$, $b^{16}$ for fourth set) related to the next level or digit of a binary number.

As illustrated in FIG. 4, the output of each pair of photocells is directed to opposed electromagnets 36, 38 each arranged to actuate a switch 40 which when in its normally open position, as illustrated, provides the "zero" output but if closed, provides a signal pulse constituting an output of "one." The electromagnet 36 associated with the upper threshold photocell 32 is stronger so that if both photocells are energized, the switch 40 remains in the open or "zero" position, and the switch 40 closes to the "one" position only when the lower threshold photocell 34 alone is energized. After each rotative cycle of the disk 30, the entire detector is deenergized preparatory to the subsequent cycle by any suitable mechanism (not shown).

The four digit binary output can be explained more readily by reference to FIG. 5 wherein the ranges of operation of the photocell pairs 32, 34 are illustrated by the elevated lines 32, 33, 34 and 35. If the previously mentioned analog input of 10.5 is chosen and the step transmission filter is rotated to produce successive subtraction of exponents, the successive energizations of the first pair of photocells corresponding to the first digit of a binary number are illustrated by the series of vertical lines 36 adjoining the first digit line 32. Such successive subtraction places no energization level of the light output of the filter within the operative range of the first double threshold detector, that is, between 1 and 2 on the FIG. 5 graph and the first binary digit is therefore "zero." The output is also "zero" for the third ring and associated detectors, but is "one" for each of the second and fourth rings and associated photocells so that the final binary output is 1010 which corresponds to the analog figure of 10 representing the next lowest integer to the input 10.5.

It will be noted that the precision of the digital conversion is determined to some extent by the number of rings, but for a given range of magnitudes is determined by the value of $b$. A value $b$ of 1.1 as utilized by way of example means that the light intensities can be digitized to magnitudes which are 10% apart so that we could come within plus or minus 5% of true value of the original analog input. A value of $b$ still closer to unity would give still more precise digital conversion. We have described conversion to the natural binary code, but it will also be observed that if the so-called "Gray" code is to be utilized rather than the natural binary code, this can be accomplished by having the first sequence of attenuations be $b^0$, $b^{-4}$, $b^{-8}$, $b^{-12}$ etc. and the first set of thresholds $b^0$ and $b^2$, the second sequence of attenuations be $b^0$, $b^{-8}$, $b^{-16}$, $b^{-32}$, etc. and the second set of threshold levels $b^1$ and $b^5$, etc.

The preliminary step of using the exponential amplifier 12' is only needed when the steps in the digital output are to have equal spacing with respect to the scale of the input variable. If equal percentage steps are desired and the digital conversion is to have constant percentage accuracy independent of the level of the input variable, no exponential amplifier is needed.

It may also be mentioned that an additional amplification of the input analog data can be utilized to in effect stretch the scale of the input variable by a factor K, the result of which is to increase the precision of the digital conversion by this same factor. Thus, a light beam varying from 1 to 10, if amplified to vary between 1 and 100, would with the above-described arrangement result in a 1% step with respect to the original variable rather than a 10% step, as was indicated in the example.

Both of the described embodiments of the invention have utilized the transmission of light and the subsequent attenuation thereof in a set of spatio-temporal sequences. It will be apparent that many modifications can be utilized to carry out the steps of the method, one such variation which generally constitutes an electronic system wherein the analog data is converted in time alone being shown in FIG. 6.

Initially, the analog input in the form of a voltage is directed to an exponential amplifier 12" to convert an input $i$ into an exponentially related output voltage $b^i$. Such output is sampled in time by a suitable switch 50 and is then delivered to an attenuator circuit 52 whose output is an exponentially decaying voltage depending upon the circuit characteristics. A range sampling of the decaying output of the exponential attenuator 52 is made by a series of detector units corresponding to the set of double photocells described in connection with FIG. 4, one of such range detectors only being illustrated in FIG. 6. More specifically, such detector includes a pair of vacuum tubes 54 and 56 whose grids are energized through a time-controlled ganged switch 58. These vacuum tubes 54 and 56 are provided with different biases corresponding to the desired upper and lower thresholds determinative of the range. For example, for the first binary digit, the biases would correspond to $b^1$ and $b^2$, and the outputs of these tubes are in turn connected to respective electromagnets 60, 62 controlling separate switches 64, 66, one normally opened switch associated with the lower threshold detector and one normally closed associated with the upper threshold detector and connected in a series circuit. The circuit will then be closed only if the lower threshold detector alone is energized to provide the binary digit 1, and, in turn, if both or neither of the detectors are energized, the circuit will remain open, and a binary output of "zero" will be obtained.

It will be observed that the opposed electromagnets 36, 38 and associated switch 40 as described in connection with FIG. 4 constitute a "semi-logical" device having the following "truth table" where T denotes the "off" or de-energized state, F, the "on" or energized state and V, the semi-logical disjunction operation. The term "semi-logical" is used in its conventional meaning to indicate that specification of input conditions to a logical-type operation does not strictly determine the output conditions of the operation.

| | Weak Electromagnet | Strong Electromagnet | V |
|---|---|---|---|
| 1 | T | T | T |
| 2 | T | F | T |
| 3 | F | T | F |
| 4 | F | F | T |

The element can therefore be utilized in other combinations such as where "decision making" is required based upon relative strengths or probabilities of the input data.

By way of example and with specific reference to FIG. 7, two opposed electromagnets 70, 72 are arranged to actuate a switch 74 generally in the fashion shown and described in connection with FIG. 4. However, the energization of each electromagnet is made variable as, for example, by the provision of multiple inputs so that the strength of each electromagnet is adjustable to thus correspond to a probabilistic logical element; that is some of the entries in the truth table under V will be reversible and will depend on which electromagnet happens to be stronger at a given time. Additionally, the relative strengths of the electromagnets 70, 72 can be reversed in a manner depending on past events and thus provide basis for an adaptive element. The manner of variation will, of course, depend on the particular application.

Many further modifications in the described method and apparatus can be devised without departing from the spirit of the present invention; and the foregoing arrangements as described are to be considered as purely exemplary and not in a limiting sense. The actual scope of the invention is to be indicated only by reference to the appended claims.

What is claimed is:

1. The method of analog to digital data conversion which comprises the steps of detecting the analog data and converting the same to an analog signal, exponentially amplifying the analog voltage signal, modulating the intensity of a light beam with the amplified voltage, sampling the modulated light beam, attentuating the light beam in separate discrete varied elements, and detecting the presence of the separate variably-attentuated, light elements above a threshold.

2. An analog to digital data converter which comprises an exponential amplifier arranged to receive and amplify an input analog voltage, a light generator, means for modulating said light generator with the analog voltage to provide a beam of light having an intensity correlated with the input analog voltage, a rotating disk having a transparent segment for intermittently passing the light beam, a plurality of variable-value transmission filters in the path of the light beam, and a light detector arranged to receive the light passed by said filters.

3. An analog to digital converter according to claim 2 wherein said light detector is arranged to sense the presence of light above a predetermined intensity threshold.

4. An analog to digital converter according to claim 2 wherein said light detector is a double detector, the sections of which are arranged to detect light above different predetermined levels.

5. An analog to digital converter according to claim 4 wherein said double detector constitutes a pair of photocells.

6. An analog to digital converter according to claim 5 which comprises circuit means connected to said photocells and arranged to be a complete circuit if one and only one of said photocells is energized.

7. The method of analog to digital data conversion which comprises the steps of varying the magnitude of the input analog signal, sampling the varied magnitude, and detecting the presence of the sampled signal above a predetermined magnitude level, said method also including the initial step of converting the input analog data to a light signal.

8. The method of analog to digital data conversion according to claim 7 wherein the step of detection includes exposure of the light signal to photographic film having a predetermined threshold level.

9. The method of analog to digital data conversion according to claim 7 wherein the step of detection includes exposure of the light signal to a photocell having a predetermined threshold level.

References Cited

UNITED STATES PATENTS

| | | | |
|---|---|---|---|
| 2,196,166 | 3/1940 | Bryce | 95—4.5 |
| 2,832,884 | 4/1958 | Berry | 250—7 |
| 2,839,727 | 6/1958 | Lozier | 332—1 |
| 2,869,079 | 1/1959 | Staffin et al. | 332—11 |
| 2,950,469 | 8/1960 | Raasch | 340—347 |
| 2,996,952 | 8/1961 | Orlando | 88—24 |
| 3,075,147 | 11/1963 | Llewellyn | 325—43 |
| 3,214,592 | 10/1965 | Wilmotte | 250—209 |
| 3,214,751 | 10/1965 | Johnson | 340—347 |

DARYL W. COOK, *Acting Primary Examiner.*

MALCOLM A. MORRISON, MAYNARD R. WILBUR, *Examiners.*

A. L. NEWMAN, L. W. MASSEY, W. KOPACZ, *Assistant Examiners.*